(12) United States Patent
Kitayama et al.

(10) Patent No.: US 6,294,123 B1
(45) Date of Patent: Sep. 25, 2001

(54) METAL MOLD FOR PRODUCING A SYNTHETIC RESIN MOLDED PRODUCT

(75) Inventors: Takeo Kitayama, Takatsuki; Shigeyoshi Matsubara, Osaka, both of (JP)

(73) Assignee: Sumitomo Chemical Company, Ltd., Osaka (JP)

( * ) Notice: Subject to any disclaimer, the term of this patent is extended or adjusted under 35 U.S.C. 154(b) by 0 days.

(21) Appl. No.: 09/224,060

(22) Filed: Dec. 31, 1998

(30) Foreign Application Priority Data

Jan. 5, 1998 (JP) .................................................. 10-000084

(51) Int. Cl.$^7$ ..................................................... B29C 45/26
(52) U.S. Cl. ....................... 264/328.9; 425/589; 425/595; 425/451.9
(58) Field of Search ..................................... 425/589, 595, 425/450.1, 451.9; 249/160; 264/328.9

(56) References Cited

U.S. PATENT DOCUMENTS 3,353,221  11/1967  Barnett et al. .
5,558,883   9/1996  Shinada et al. .

FOREIGN PATENT DOCUMENTS 61-63422-A   4/1986  (JP) .
3-16893      3/1991  (JP) .

Primary Examiner—James P. Mackey
(74) Attorney, Agent, or Firm—Fitch, Even, Tabin & Flannery

(57) ABSTRACT

The present invention relates to a metal mold for producing a synthetic resin molded product, particularly a thermoplastic resin molded product, which is characterized by comprising: a first mold, a sliding mold that is allowed to slide over the entire outer circumferential face or on a portion of said first mold, a second mold having a parting face that is capable of contacting the face of the outer circumference of said sliding mold, and a mechanical clamping mechanism that makes the outer circumferential portion of the said sliding mold mechanically coupled to said second mold, wherein said sliding mold has a sliding direction that is the same as the opening and closing direction of the two molds, that is, the first mold and the second mold, and the sliding face between the first mold and the sliding mold is located inside the outer circumferential line, of a plane projection figure in the opening and closing direction of the metal mold, of a synthetic resin molded product which is molded by the metal mold for producing a synthetic resin molded product. When the metal mold of the present invention is used for producing a synthetic resin molded product, it becomes possible to eliminate burrs being produced along the outer circumferential line, of a plane projection figure in the opening and closing direction of the metal mold, of the synthetic resin molded product, thereby making it possible to produce a product with good appearance.

7 Claims, 4 Drawing Sheets

METAL MOLD FOR PRODUCING A SYNTHETIC RESIN MOLDED PRODUCT

BACKGROUND OF THE INVENTION

1. Field of the Invention

The present invention relates to a metal mold for producing a synthetic resin molded product, particularly a thermoplastic resin molded product.

2. Description of the Prior Art

Conventionally, a producing method for a synthetic resin molded product has been well-known, in which a pair of male and female molds that are freely opened and closed are used, and the synthetic resin molded product is produced by clamping and compressing melted synthetic resin that has been supplied between the two molds.

However, in such a conventional method, the sliding faces or the contact faces of the paired male and female molds are placed along the outer circumferential line of the plane projection figure in the mold-clamping direction of a synthetic resin molded product to be obtained; consequently, burrs are produced along the outer circumferential portion of the molded product due to the melted synthetic resin entering between the sliding faces or the contact faces.

For this reason, problems are encountered in which: curved portions are not formed along the outer circumferential portion of the molded product, burrs tend to cause a cut in the hand of the worker and the product might be stuck during a line transportation, causing a jam; thus, in order to avoid these problems, an extremely time-consuming task, i.e. burr removing, is required.

Moreover, in order to form a hole in the molded product, a construction, in which a pin is put on the female mold or the male mold and the pin is allowed to contact the other mold, is generally used. However, in the conventional mold structure, the pin is only put in the same direction as the mold-clamping direction, which limits the positions of holes and the directions of holes.

In order to solve this problem, an upper-lower separation type metal mold for producing a synthetic resin molded product has been proposed, in which a first mold, a sliding mold that is allowed to slide relative to the mold, a second mold that is engaged with the siding mold and an extending device installed in the sliding mold, are provided (see Japanese Examined Patent Publication No. 16893/1991 (Tokukou-hei 3-16893).

However, in the mold of this type, the sliding mold and the second mold are fixed by the extending device, but the extending device tends to fail to sufficiently secure the sliding mold and the second mold depending on the molding conditions and types of the synthetic resin to be used.

BRIEF SUMMARY OF THE INVENTION

Under such circumstances, the inventors of the present invention have made efforts to improve the above-mentioned mold and to develop a mold for producing a synthetic resin molded product which can sufficiently secure the sliding mold and the second mold, while eliminating the generation of burrs, etc. along the outer circumferential line of the plane projection figure in the opening and closing direction of the mold, i.e. in the mold-clamping direction of the synthetic resin molded product to be obtained.

In the mold for producing a synthetic resin molded product, the present invention is to provide (1) a metal mold for producing a synthetic resin molded product, which is characterized by comprising: a first mold, a sliding mold that is allowed to slide over the entire outer circumferential face or on a portion of said first mold, a second mold having a parting face that is capable of contacting the face of the outer circumference of said sliding mold, and a mechanical clamping mechanism that makes the outer circumferential portion of the said sliding mold mechanically coupled to said second mold, wherein said sliding mold has a sliding direction that is the same as the opening and closing direction of the two molds, that is, the first mold and the second mold, and the sliding face between the first mold and the sliding mold is located inside the outer circumferential line, of a plane projection figure in the opening and closing direction of the metal mold, of a synthetic resin molded product which is molded by the metal mold for producing a synthetic resin molded product, (2) the metal mold according to item no. 1, wherein: the mechanical clamping mechanism is a mechanical clamp which is constituted by a wedge pillar having a wedge hole and a wedge that is allowed to be precisely inserted into the wedge hole, and said wedge pillar is formed on the second mold and said wedge is formed in the sliding mold, or said wedge pillar is formed on the sliding mold and said wedge is formed in the second mold, (3) the metal mold according to item no. 1, wherein: the mechanical clamping mechanism is a U-letter shaped clamp and the second mold and the sliding mold are provided with grooves or inserting holes at predetermined positions so that both of the ends of the clamp are inserted therein, (4) the metal mold according to item no. 1, 2 or 3, wherein a melted synthetic resin path, which has an opening on the mold surface so as to supply melted synthetic resin between the molds, is formed inside the first mold or the second mold, (5) the metal mold according to item no. 1, 2, 3 or 4, wherein the synthetic resin is thermoplastic resin, (6) a molding device which is characterized by comprising the metal mold as defined in item no. 1, 2, 3, 4 or 5, (7) a method for producing a synthetic resin molded product, which comprises the step of mold-clamping the metal mold as defined in item no. 1, 2, 3, 4 or 5, (8) use of the metal mold as defined in item no. 1, 2, 3, 4 or 5 for producing a synthetic resin molded product.

DETAILED DESCRIPTION OF THE PREFERRED EMBODIMENT

Figures 1A, 1B, 1C, 1D, 1E:
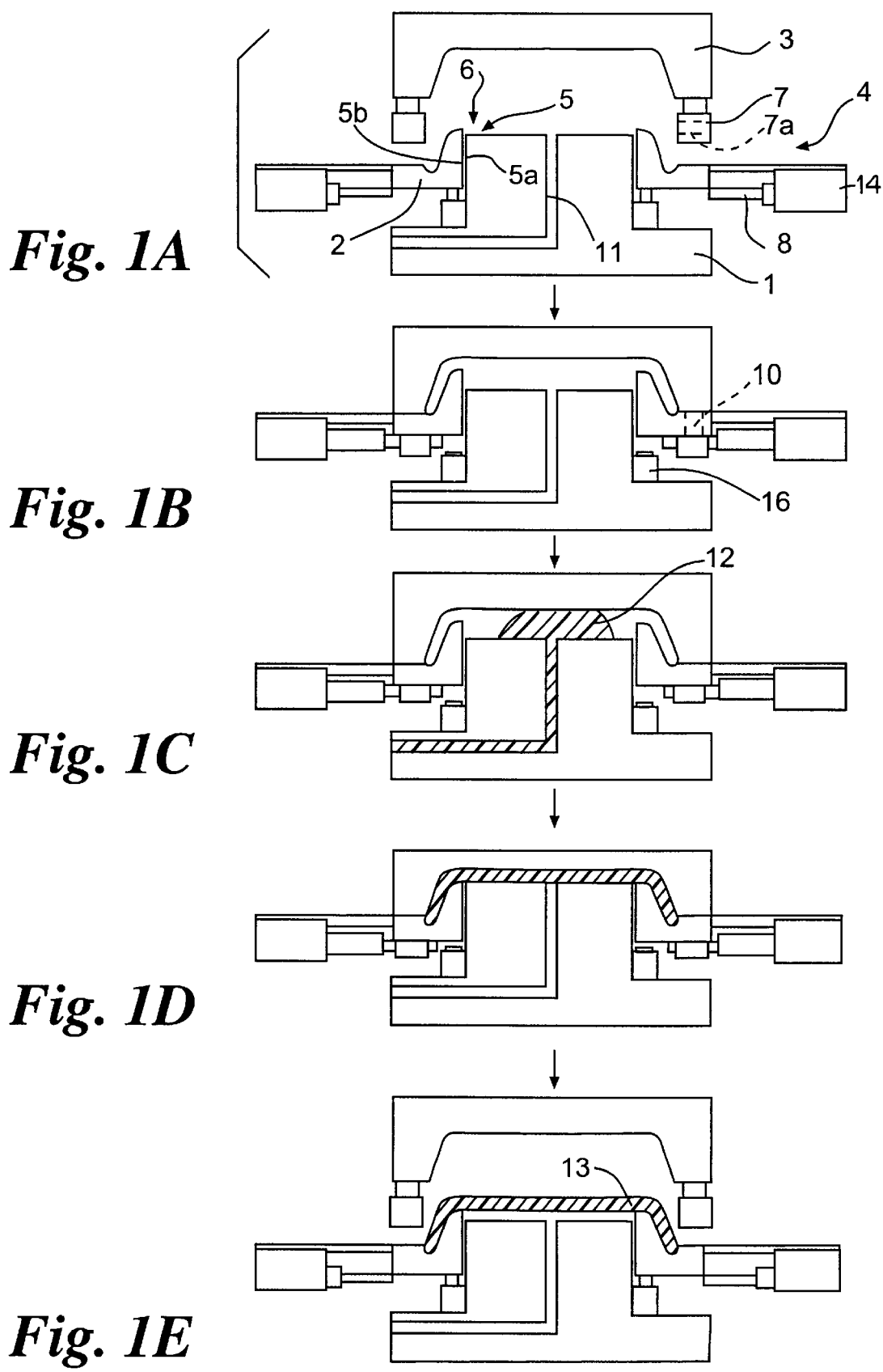
FIGS. 1A–1E shows producing processes of a synthetic resin molded product by the use of the metal mold of the present invention.

Referring Figures, the following description will discuss embodiments of the metal mold for producing a synthetic resin molded product of the present invention.

FIG. 1 is a schematic cross-sectional view that shows the metal mold for producing a synthetic resin molded product of the present invention, as well as its producing processes, for example, in the case of a metal mold that are opened and closed in upward and downward direction. The metal mold in the Figure is constituted by a mold A(1), a sliding mold (2) that is placed over the outer circumferential portion of the mold A and is allowed to freely slide over the mold A, and a mold B(3) that is engaged with the sliding mold, and upon completion of molding, the molding face of the mold A(1) and the molding face of the sliding mold (2) combinedly form a molding face as a lower mold which is the same as that in a so-called upper-lower type mold.

Within a gap between the mold A(1) and the sliding mold (2) is located a sliding portion (5) having an appropriate sliding clearance (6), and the two molds are allowed to freely slide through the sliding face (5a) of the mold A(1) and the sliding face (5b) of the sliding mold (2).

A wedge pillar (7) having a wedge hole (7a) is formed on the parting face of the mold B(3), and a hydraulic cylinder (14) is connected to the outer circumferential edge of the sliding mold (2) opposing to the parting face. A through hole or a groove (10) to which the wedge pillar (7) is fitted is formed in the circumferential edge of the sliding mold (2), and a wedge (8) is formed on the hydraulic cylinder so that it is allowed to fit to the wedge hole (7a) of the wedge pillar (7) that has passed through the through hole or the groove (10) formed in the circumferential edge of the sliding mold (2), with the wedge (8) being allowed to advance and retract in the horizontal direction.

Moreover, an extending device (16) is installed below the sliding mold (2), if necessary. The extending device is used for raising the sliding mold (2) to a predetermined position prior to the start of mold-clamping so as to adjust the cavity clearance; therefore, even in the case when this is installed, since the only required function is basically to raise the sliding mold (2), it is not necessary to secure its tip portion onto the sliding mold (2) upon installation, and it is only necessary for the extending device to be solely separated from the sliding mold and descend downward upon the start of mold-clamping.

It is, of course, not necessary to provide the extending device in the case when the position of the sliding mold prior to the start of mold-clamping is preliminarily fixed.

The following description will discuss a producing method for a synthetic resin molded product by the use of the above-mentioned metal molds, while explaining the operation of the metal molds.

FIG. 1A shows the metal molds prior to the start of molding, in which the mold A(1), the sliding mold (2) and the mold B(3) are in an open state, with the sliding mold (2) and the mold B(3) being separated from each other.

At this time, the sliding mold (2) is pressed and raised by the extending device to a position having a predetermined cavity clearance at the start of molding.

In this state, the mold B(3) is lowered and the mold is closed so that a cavity having a predetermined product shape is formed except for the molding face of the mold A(1).

During this process, the wedge pillar (7) attached to the mold B(3) passes through the through hole or the groove (10) formed in the circumferential edge of the sliding mold (2), and when the tip of the wedge hole (7a) formed in the wedge pillar (7) is located below the under surface of the sliding mold (2), the wedge (8) is inserted through the wedge hole (7a) by the operation of the hydraulic cylinder (14).

Consequently, the sliding mold (2) and the mold B(3) are combined into an integral part firmly and mechanically through the wedge pillar (7), as if it had a single mold shape.

During this process, the cavity face of the mold A(1) is located at a predetermined position so as not to contact the cavity face of the opposing mold B(3).

After the sliding mold (2) and the mold B(3) have been mechanically secured in this manner, the mold A(1) is raised or lowered so that the clearance of the cavity face of the mold A(1) and the cavity face of the mold B(3) is adjusted so as to become wider than that at the time of completion of molding, with a predetermined mold-clamping margin being left.

Here, the adjustment of the cavity clearance may be carried out prior to the mechanically securing process of the sliding mold (2) and the mold B(3).

Moreover, since the cavity clearance is constant in a general production process, the sliding mold (2) may be raised from the mold A(1) by the extending device up to the corresponding cavity clearance position, and after the sliding mold (2) has been mechanically secured to the mold B(3), it may be released from the extending device. (FIG. 1B).

In this state, a predetermined amount of melted synthetic resin (12) is supplied between the mold A(1) and the mold B(3) through a melted synthetic resin supplying inlet (11) formed in a predetermined position. (FIG. 1C) In a predetermined time period after the supply of the melted synthetic resin or after the start of the supply, a mold-clamping operation is carried out. (FIG. 1D).

In this case, the mold-clamping operation, which is carried out by lowering the mold B(3) that has been integrally coupled to the sliding mold (2) or raising the mold A(1), is carried out along the sliding face (5a) of the mold A(1) and the sliding face (5b) of the sliding mold (2).

Upon completion of the mold-clamping, in a time period until the synthetic resin inside the cavity is cooled off and solidified and the metal molds are opened, the hydraulic cylinder (14) is operated so as to draw the wedge (8) that has been inserted through the wedge hole (7a), thereby releasing the coupled state of the sliding mold (2) and the mold B(3) and opening the mold A(1) and the mold B(3) so as to obtain a synthetic resin molded product (FIG. 1E).

Figures 2A, 2B, 2C, 2D, 2E:
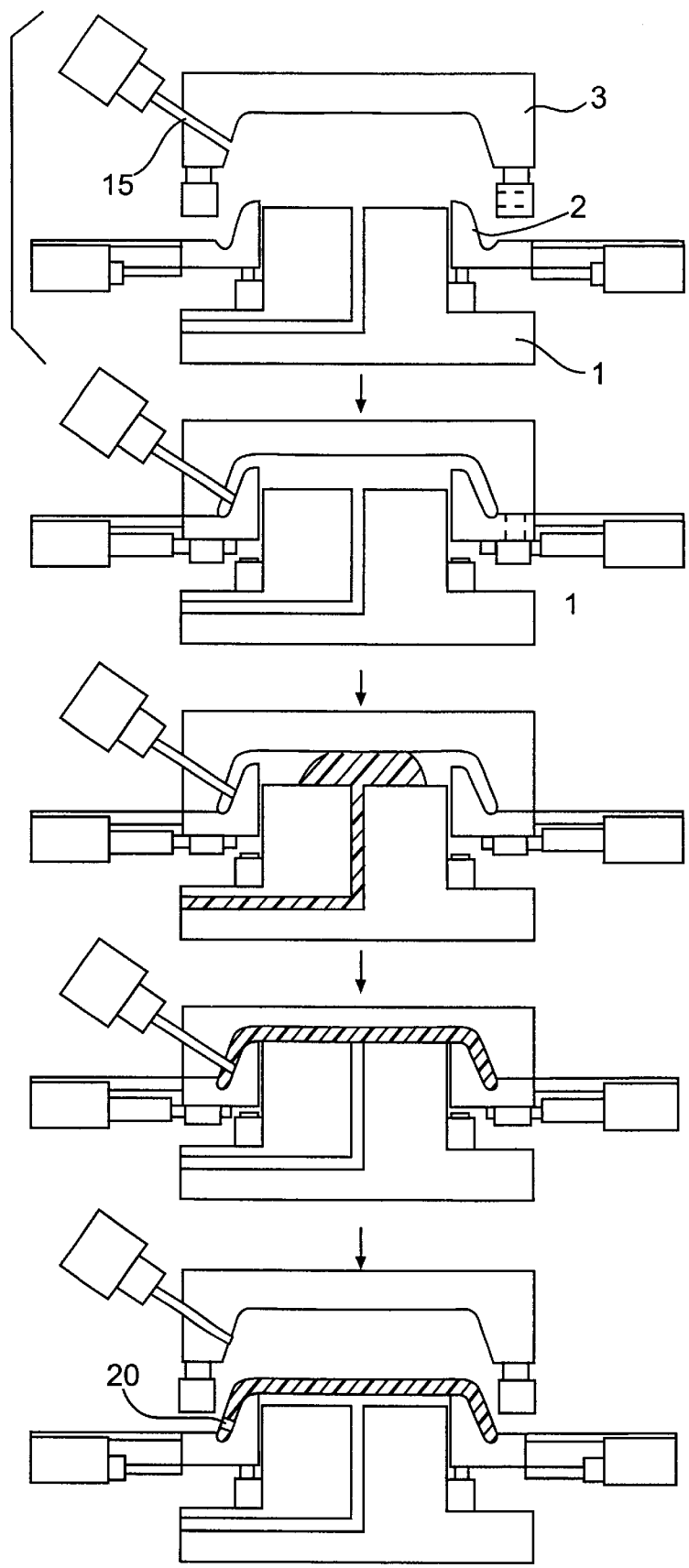
FIGS. 2A–2E shows producing processes of a synthetic resin molded product by the use of the metal mold of the present invention.

In such a metal mold, as illustrated in FIG. 2A, a slidable pin (15), which is placed in a portion of the mold B(3) constituting the fixed cavity space portion formed by the mold B(3) and the sliding mold (2) that are secured as an integral one unit, and penetrates through the molding face at the corresponding portion, may be provided; thus, the molding is carried out in the same method as described above, with the result that a synthetic resin molded product having a hole in a direction different from the mold-clamping direction can be obtained.

In this case, the mold B(3) and the sliding mold (2) are secured and integrally coupled in the above-mentioned method, and then the slidable pin (15) is allowed to advance by an appropriate shifting means such as a hydraulic cylinder so that it is inserted inside the cavity until the tip comes into contact with the molding face of the sliding mold (2) (FIG. 2B). Thereafter, the supply of melted synthetic resin, the mold-clamping and the cooling are carried out in the same manner as described above.

Here, the tip of the slidable pin (15) to be inserted may be allowed only to come into contact with the molding face of the sliding mold (2) as described above; alternatively, a pin hole for receiving the pin may be preliminarily formed on the molding face of the sliding mold (2) at a position with which the pin comes into contact, and the pin may be inserted into the pin hole.

The slidable pin (15) thus inserted is made to retract and drawn prior to the release of the mold B(3) and the sliding mold (2) from their coupled state; thus, it becomes possible to obtain a molded product having a hole (20) at the corresponding position of the slidable pin (15).

Additionally, in this example, the melted synthetic resin path is provided inside the mold A(1); however, it may be provided inside the mold B(3).

Moreover, in the case when the melted synthetic resin can be supplied into the cavity directly from the outside of the metal mold, the installation of the melted synthetic resin path may be omitted.

Furthermore, in this example, the wedge pillar (7) is formed in the mold B(3); however, the wedge pillar may be formed on the circumferential edge of the sliding mold (2) toward the mold B(3), and a hole or a cut-out to which the wedge pillar can be inserted is formed in the mold B(3), and a hole through which the wedge (8) is inserted into the wedge hole (7a) formed in the inserted wedge pillar is also formed therein; thus, it is possible to secure the mold B(3) and the sliding mold (2) integrally in the same manner as described earlier.

When a molding operation is carried out using such a metal mold, the outer circumferential end of the molding face of the mold B(3) and the outer circumferential end of the molding face of the sliding mold (2) are coupled to each other; therefore, since no sliding portion is located along the outer circumferential portion of a synthetic resin molded product to be obtained, burrs, which result from the sliding portion, are not produced along the outer circumferential portion of the synthetic resin molded product, thereby making it possible to produce a product with good appearance.

In the metal mold of the present invention, the mechanical clamping mechanism is not particularly limited, as long as it allows the sliding mold (2) and the mold B(3) to be secured in an integrated manner; and the above-mentioned construction including the wedge pillar (7) with the wedge hole (7a) and wedge (8) is one typical example of the mechanism.

FIG. 3 shows a specific example of the mechanism having the wedge pillar (7) having the wedge hole (7a) and the wedge (8). Here, it is only essential for the wedge pillar (7) with the wedge hole (7a) to be formed integrally with the mold (mold B in the above-mentioned example) that is to be mechanically clamped by the sliding mold (2); therefore, it may be provided as an integral part in the structure of the mold itself, or the wedge pillar (7) with a wedge hole (7a), which has been preliminarily prepared, may be fixed to the mold by means of screws, etc.

With respect to the above-mentioned wedge pillar (7) with a wedge hole (7a), it is necessary to provide a sufficient mechanical strength since its purpose is to integrally secure the sliding mold (2) and the mold B(3), and also to design it based upon calculations on the strength that depends on the mold-clamping pressure and the number of the wedge pillars to be used.

Figure 3A:
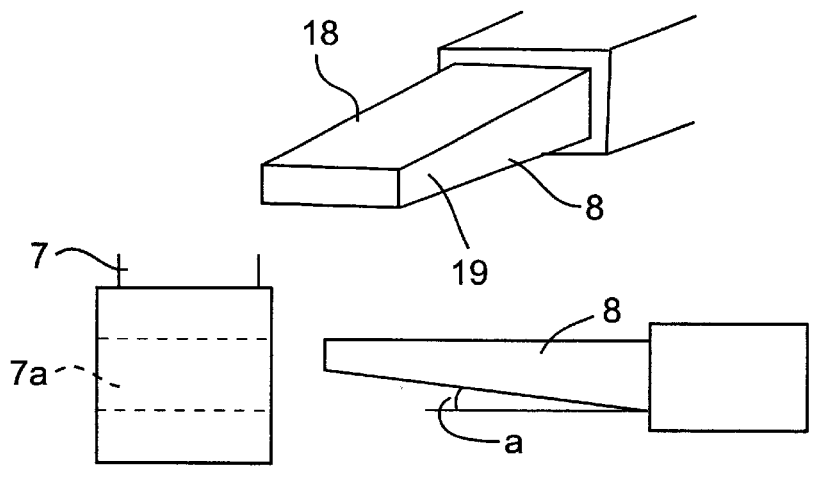
FIGS. 3A–3D shows an example of a wedge and a wedge hole in the metal mold of the present invention.
Figure 3B:
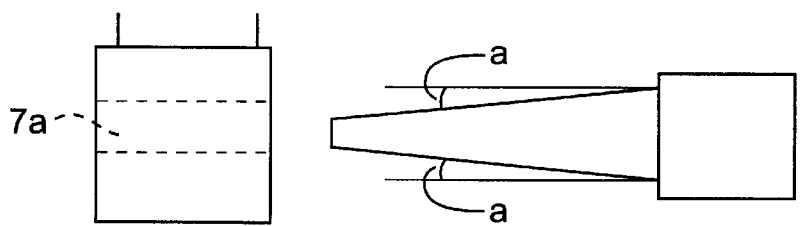
Figure 3C:
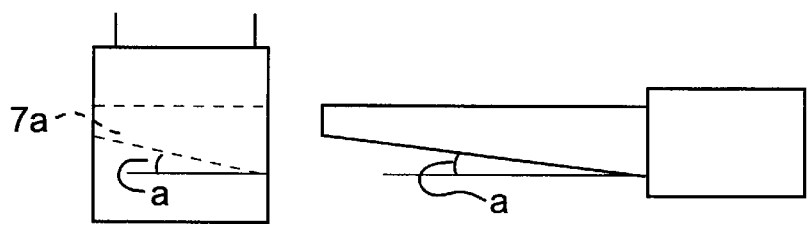
Figure 3D:
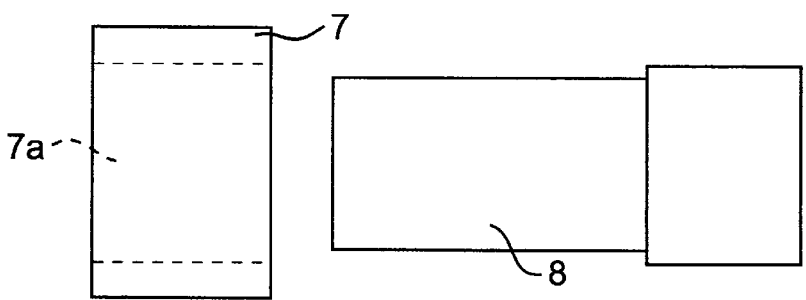

Moreover, the wedge (8) has to be precisely inserted and drawn to and from the wedge hole (7a) formed in the wedge pillar (7); therefore, for example, in the case of a wedge having a square cross-section, it is preferable to provide a certain degree of a taper angle a° on either the upper or lower face (18), or on both of them, of the wedge (8) that are perpendicular to the mold-clamping direction of the metal mold. (FIGS. 3A–C on the right side). The taper angle a° is preferably set in the range of about 3° to about 15° since a smaller taper angle causes a difficulty in insertion and a larger angle causes coming off of the wedge.

The wedge hole (7a) is not particularly limited as long as it allows the wedge (8) to be inserted and drawn to and from it, and as long as it has such a size that upon insertion of the wedge (8), the wedge faces (18) perpendicular to the mold-clamping direction of the metal mold come into contact with the faces of the wedge hole in the direction perpendicular to the mold-clamping direction.

Moreover, it is preferable to provide the wedge hole (7a) with the same taper angle as the taper angle of the wedge (8). (FIG. 3C).

With respect to the faces of the wedge (8) in the same direction as the mold-clamping direction, it is preferable to set these faces to be slightly smaller than those of the wedge hole (7a).

In other words, by inserting the wedge (8) into the wedge hole (7a), the mold B(3) and the sliding mold (2) have to be secured in the mold-clamping direction without an idle space.

With respect to the wedge (8), it is necessary to provide a sufficient mechanical strength in the same manner as the aforementioned wedge pillar (7), and also to design it based upon calculations on the strength that depends on the mold-clamping pressure, the number of the wedges to be used, the material property, etc.

Additionally, in the above-mentioned example, the hydraulic cylinder is used in inserting and drawing the wedge (8) to and from the wedge hole (7a); however, not limited to the hydraulic cylinder, any means may be adopted as long as the inserting and drawing operations are available.

Furthermore, as another example of the mechanical clamping mechanism for integrally secure the sliding mold (2) and the mold B(3), the following clamping mechanism is listed, in which, as shown in FIG. 4, a U-letter shaped clamp (9) and grooves or inserting holes formed in a predetermined positions of the sliding mold (2) and the mold B(3) are provided and the sliding mold (2) and the mold B(3) are secured as an integral unit by fitting two claws (9a and 9b) of the U-letter shaped clamp to the grooves or the inserting holes formed in the predetermined positions of the sliding mold (2) and the mold B(3).

In the case of the application of the U-letter shaped clamp (9), in a state where the mold A(1) and the mold B(3) are completely opened and the mold B(3) and the sliding mold (2) are released from their fixed state, both of the two claws (9a and 9b) of the U-letter shaped clamp (9) may be drawn from the grooves or inserting holes formed in the sliding mold (2) and the mold B(3), or either of the claws may be drawn with the other claw remaining in the inserted state into the groove or the inserting hold.

In the latter case, either of the two claws (9a and 9b) of the U-letter shaped clamp (9) is set longer than the other, and the tip of this claw is preliminarily inserted into an inserting hole formed, for example, in the outer circumferential side face of the mold B(3), and the tip of the other shorter claw is maintained so as not to contact the outer circumferential side face of the mold A(1). (FIG. 4A)

In the former case, the lengths of the two claws of the U-letter shaped clamp may be the same or different from each other, but it is not necessary to change the lengths.

Figure 4A:
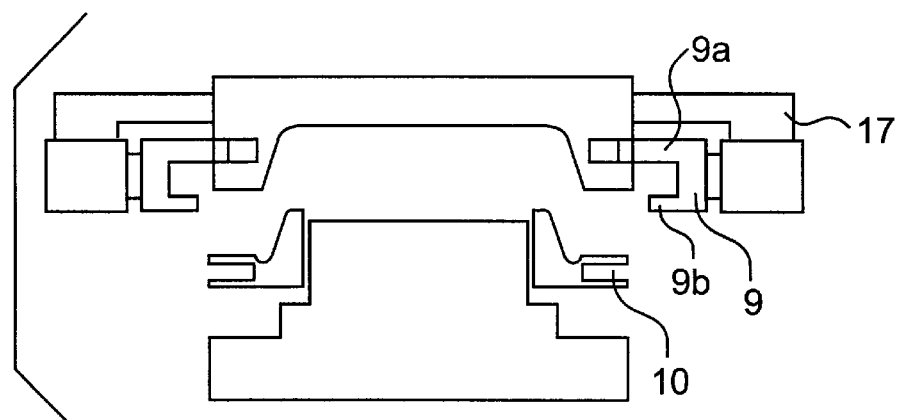
FIGS. 4A–4B shows a metal mold in accordance with another embodiment of the present invention.
Figure 4B:
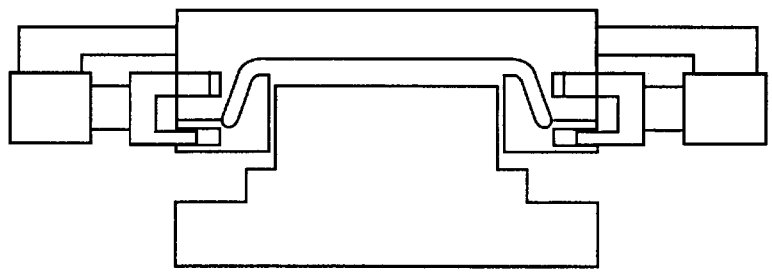

In the case where, as shown in FIG. 4, a U-letter shaped clamp (9) is provided with two claws (9a and 9b) having mutually different lengths with the longer claw (9a) being fitted into a clamp-claw inserting hole or a groove (10) that allows the clamp claw to slide therein in the length direction and that is formed in the mold B(3) (FIG. 4A), when the mold A(1) and the mold B(3) are closed so that the mold B(3) and the sliding mold (2) are brought into a position at which they are to be integrally secured, the mold B(3) and the sliding mold (2) are integrally secured (FIG. 4B) by fitting the shorter claw (9b) of the U-letter shaped clamp (9) into an inserting hole or a groove (10) formed in the sliding mold (2), while the longer claw (9a) is further pushed into the inserting hole or the groove (10) by a driving device such as a hydraulic cylinder (17). Then, the molding operation is carried out in the same manner as described earlier, and when the molds are released from their secured state, the U-letter shaped clamp (9) is retracted by the hydraulic cylinder (17) so that the shorter claw (9b) is drawn to its initial state.

Figure 5:
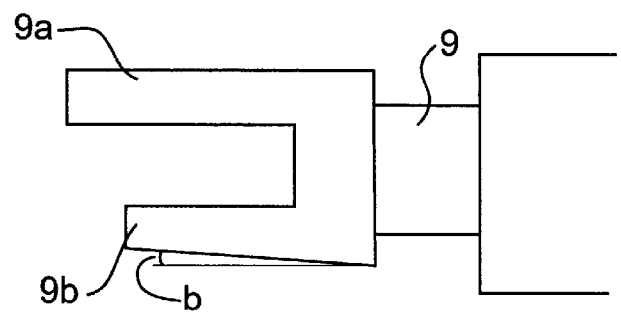
FIG. 5 shows a claw of a U-letter shaped clamp.

In such a U-letter shaped clamp (9) also, it is preferable to provide a certain degree of taper angle b° to either of the two claws (9a and 9b) or both of them so as to allow easy insertion in the same manner as the aforementioned wedge (8). The taper angle b° is also preferably set in the range of about 3° to about 15° since a smaller taper angle causes a difficulty in insertion and a larger angle causes coming off of the claw. (FIG. 5)

Moreover, in the case of a claw having a square cross-section, the taper angle may be provided to both of the faces of the U-letter shaped clamp (9) perpendicular to the opening and closing direction of the metal mold, or to one face of either one, or to all the faces, if necessary.

With respect to the grooves (10), they are not particularly limited, as long as they have a size which allows the claws (9a and 9b) of the U-letter shaped clamp (9) to be inserted therein and which also allows the faces of the U-letter shaped clamp (9) in the direction perpendicular to the mold-clamping direction to come into contact with the faces of the groove in the direction perpendicular to the mold-clamping direction.

For these grooves, it is preferable to provide a taper angle corresponding to the claw in the same manner as the aforementioned wedge (8) and wedge hole (7a).

With respect to the faces of the claws (9a and 9b) of the U-letter shaped clamp (9) in parallel with the opening and closing direction of the metal mold, it is preferable to set them slightly smaller than the grooves (10).

In other words, the mold B(3) and the sliding mold (2) have to be secured in the mold-clamping direction without an idle space by fitting the claws (9a and 9b) into the inserting holes or the grooves (10).

In the case of the application of such a U-letter shaped clamp (9), of course, it is necessary to provide a sufficient mechanical strength to the clamp itself as well as to the respective molds that are subject to formation of the inserting holds and grooves, and also to design it based upon calculations on the strength that depends on the mold-clamping pressure, the number of the claws to be used, the material property, etc.

With respect to the mechanical clamping mechanism (4) for firmly coupling the sliding mold (2) and the mold B(3) into an integral form, a plurality of them are generally placed, for example, in a manner so as to be symmetrically positioned to the synthetic resin molded product, with a proper balance of the metal mold; for example, in the case of a square-shaped mold, they are placed at the respective corners of the mold. Moreover, it is preferable to place them closest to the mold cavity face, or to increase the number of them in the case of a high mold-clamping pressure, so as to minimize loads imposed on the mechanical clamping mechanism.

With respect to the metal molds of the present invention, not limited to the case in which the mold A(1) is a female mold and the mold B(3) is a male mold, the mold A(1) may be a male mold and the mold B(3) may be a female mole; the mold to which the sliding mold is secured may be the mold A(1) or may be the mold B(3); and the clamping direction of the molds is not limited to the up and down direction, and may be the right and left direction. There do not make essential differences.

The mechanical clamping mechanism of the present invention may be combinedly used with a conventionally known extending device such as disclosed by Japanese Examined Patent Publication 16893/1991 (Tokukou-hei 3-16893).

For such an extending device, in general, steel springs, urethane springs, hydraulic cylinders, cushions of hydraulic press, gas-pressure springs, etc. are listed, and the application of the gas-pressure springs is more preferable.

In particular, in a combined use of the mechanical clamping mechanism in the present invention with such an extending device, when it is not possible to place the mechanical clamping mechanism between the synthetic resin molded products in the case of a multiple cavity mold for producing a number of products from one mold, the extending device is installing in such a place; thus, the molds to be secured such as the mold B(3) and the sliding mold (2) are more firmly secured.

With respect to synthetic resins used in producing a synthetic resin molded product by the use of the metal mold of the present invention, no specific limitation is applied as long as they are generally used in molding methods such as injection molding, injection compression molding, extrusion molding and stamping molding; for example, common thermoplastic synthetic resins such as polyolefin resins (such as polyethylene and polypropylene, etc.), polystyrene, acrylic resins, styrene-acrylonitrile copolymer, acrylonitrile-styrene-butadiene copolymer, polyvinyl chloride, polyamides, polycarbonate, polyethyleneterephthalate, polybutyleneterephthalate and polyphenylene ether, various thermoplastic elastomers, mixtures of these and polymer alloys using these, etc. may be used.

The synthetic resins may contain, if necessary, fillers, such as talc, glass fiber, various inorganic such as wollastonite or organic fillers, which are generally used, and may also contain various additive agents such as antioxidants, anti ultraviolet agents, various pigments, lubricating materials, static-eliminating agents and stabilizers, which are generally used.

What is claimed is:

1. A metal mold for producing a synthetic resin molded product comprising:

a first mold, a sliding mold that is allowed to slide over an outer circumferential face or a portion of the outer circumferential face of said first mold, a second mold having a parting face that is capable of contacting an outer circumferential face of said sliding mold, and a mechanical clamping mechanism that makes the outer circumferential portion of said sliding mold mechanically coupled to said second mold, wherein at least one of said sliding mold and said second mold comprises grooves and/or inserting holes for inserting said clamping mechanism;

wherein said sliding mold has a sliding direction that is the same as the opening and closing direction of the first mold and the second mold, and a sliding face between the first mold and the sliding mold is located inside the outer circumferential line, of a plane projection figure in the opening and closing direction of the metal mold, of a synthetic resin molded product which is molded by the metal mold for producing a synthetic resin molded product.

2. The metal mold according to claim 1, wherein said mechanical clamping mechanism is a mechanical clamp comprising a wedge pillar having a wedge hole and a wedge that is allowed to be precisely inserted into the wedge hole, and wherein said wedge pillar is formed on the second mold and said wedge is formed in the sliding mold, or said wedge pillar is formed on the sliding mold and said wedge is formed in the second mold.

3. The metal mold according to claim 1, wherein said mechanical clamping mechanism is a U-shaped clamp, and the second mold and the sliding mold are provided with said grooves or inserting holes at predetermined positions so that both ends of the clamp are inserted therein.

4. The metal mold according to any one of claims 1, 2 or 3, wherein a melted synthetic resin path having as opening on a mold surface to supply melted synthetic resin between the molds, is formed inside the first mold or the second mold.

5. A method for producing a synthetic resin molded product comprising molding a synthetic resin utilizing the metal mold of claim 1.

6. A metal mold for producing a synthetic resin molded product comprising:

a first mold, a sliding mold that is allowed to slide over an outer circumferential face or a portion of the outer circumferential face of said first mold, a second mold having a parting face that is capable of contacting an outer circumferential face of said sliding mold, and a mechanical clamping mechanism engaging said sliding mold and said second mold into an integral part, so to prevent movements of said sliding mold relative to said second mold;

wherein said sliding mold has a sliding direction that is the same as the opening and closing direction of the first mold and the second mold, and a sliding face between the first mold and the sliding mold is located inside the outer circumferential line, of a plane projection figure in the opening and closing direction of the metal mold, of a synthetic resin molded product which is molded by the metal mold for producing a synthetic resin molded product.

7. A metal mold for producing a synthetic resin molded product comprising:

a first mold, a sliding mold that is allowed to slide over an outer circumferential face or a portion of the outer circumferential face of said first mold, a second mold having a parting face that is capable of contacting the face of the outer circumference of said sliding mold, and a mechanical clamping mechanism that makes the outer circumferential portion of said sliding mold mechanically coupled to said second mold, wherein at least a portion of said clamping mechanism is integrally formed with said sliding mold and/or said second mold;

wherein said sliding mold has a sliding direction that is the same as the opening and closing direction of the first mold and the second mold, and a sliding face between the first mold and the sliding mold is located inside the outer circumferential line, of a plane projection figure in the opening and closing direction of the metal mold, of a synthetic resin molded product which is molded by the metal mold for producing a synthetic resin molded product.

* * * * *